3,661,871
PRODUCTION OF NON-CONJUGATED DIENES HAVING 4,7,8,9-TETRAHYDROINDENE STRUCTURES FROM A HYDROCARBON MIXTURE CONTAINING CYCLOPENTADIENE AND ANOTHER $C_5$ CONJUGATED DIENE AND PRODUCTION OF VULCANIZABLE COPOLYMERS THEREFROM BY POLYMERIZATION WITH $\alpha$-OLEFINS David Arthur Gregson Walmsley, Runcorn, and Roy John Sampson, Billingham, England, assignors to Imperial Chemical Industries Limited, London, England
No Drawing. Filed May 3, 1967, Ser. No. 635,673
Claims priority, application Great Britain, May 24, 1966, 23,152/66
Int. Cl. C08f 17/00
U.S. Cl. 260—80.78                                    15 Claims

ABSTRACT OF THE DISCLOSURE

Amorphous vulcanisable high molecular weight polymers obtained by the copolymerisation of at least one $\alpha$-olefin with a hydrocarbon fraction containing non-conjugated dienes selected from 4,7,8,9-tetrahydroindene and methyl derivatives thereof, said fraction having been obtained by heating a multi-component hydrocarbon stream containing cyclopentadiene and at least one other $C_5$ conjugated diene to cause Diels-Alder reaction between the said dienes.

---

This invention relates to new amorphous, high molecular weight vulcanisable copolymers of $\alpha$-olefins and non-conjugated dienes, and to a process for their production.

It is known that synthetic amorphous polymers containing residual unsaturation and vulcanisable to elastomers having properties very like the vulcanised rubbers may be obtained by polymerising selected non-conjugated dienes with $\alpha$-olefins in the presence of co-ordinated anionic catalyst systems. The $\alpha$-olefinic content is usually derived from a mixture of ethylene and at least one other $\alpha$-olefin, generally propylene.

Many non-conjugated dienes have been proposed for use in the synthesis of these copolymers. Examples are given of linear dienes, cyclic dienes, polycyclic dienes, cyclic monoenes with ethylenically unsaturated side chains, and endomethylenic bicyclic and polycyclic dienes.

Although many of the dienes proposed have not been acceptable for one reason or another, e.g. premature crosslinking during the copolymerisation, poor copolymerisability with $\alpha$-olefins, poor rates of vulcanisation of the products or poor physical properties of the vulcanisates, bicyclic dienes having ethylenic unsaturation in each of the rings have been found to be worthy of further consideration. Outstanding amongst these are 4,7,8,9-tetrahydroindene and substituted derivatives thereof, especially 4,7,8,9-tetrahydroindenes wherein one or both of the hydrogen atoms on one, but only one, of the pairs of ethylenically unsaturated carbon atoms, is or are replaced by methyl groups. Of the particular bicyclic dienes, those satisfying the structure I below, where each of $R_1$, $R_2$ $R_3$ and $R_4$ is a hydrogen atom or an alkyl, particularly methyl, group (and preferably wherein at least one of $R_3$ and $R_3$ is a methyl group), and to which the numbering of the carbon atoms is allocated as shown,

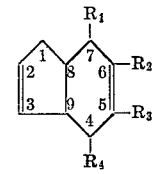

(I)

are readily polymerisable with $\alpha$-olefins without undue premature cross-linking occurring during the polymerisation reaction to yield readily vulcanisable products whose vulcanisates have a desirable combination of mechanical properties, e.g. tensile strength and modulus.

4,7,8,9-tetrahydroindene and its 4-, 5-, 6- and 7-methyl substituted derivatives are of special note because they are readily available from the Diels-Alder reaction of cyclopentadiene with butadiene, isoprene or piperylene, all of which are found to a greater or lesser extent in cheap and available multi-component hydrocarbon streams such as cracked naphtha fractions. However, because of the difficulty of separating these dienic starting materials from the hydrocarbon streams in which they are found, these tetrahydroindenes are relatively expensive. The difficulty arises from the closeness of the boiling points of the starting materials to each other and to other components of the hydrocarbon streams, thereby rendering efficient separation difficult or impossible. For example, in the case of the production of the highly desirable 5- and/or 6-methyl-4,7,8,9-tetrahydroindenes, the boiling points of the starting materials, which are isoprene and cyclopentadiene, differ by only 6–7° C. and differ by as little as 1–2° C. from that of piperylene which is another likely member of any hydrocarbon fraction containing them. Because of this, recourse has to be made to other and more complicated techniques for separating them or, alternatively, they have to be made synthetically.

Furthermore, because the Diels-Alder reaction generally yields a multitude of homodimeric and codimeric products in addition to the desired codimers and having boiling points very close to those of said desired codimers, still more is added to the cost of the tetrahydroindenes if they are required in the highly pure state which is generally recognised as an established prerequisite for the satisfactory and reproducible polymerisation of $\alpha$-olefins to useful products.

We have now found, quite unexpectedly, that amorphous, high molecular weight vulcanisable copolymers may be obtained by (a) heating a multi-component hydrocarbon stream containing cyclopentadiene and at least one other $C_5$ conjugated diene so as to effect a Diels-Alder reaction between the two and (b) using a fraction of the product containing the $C_{10}$ non-conjugated dienes having 4,7,8,9-tetrahydroindene structures so obtained as the material to be copolymerised with the $\alpha$-olefin or $\alpha$-olefins. Our process is remarkable in that it obviates the need to start from pure $C_5$ conjugated diene or expressly to separate the mixture of homodimers and codimers obtained in the product of the heat treatment. The economic advantages gained thereby will readily be appreciated.

Furthermore, still more surprisingly we have found that by the use of certain conditions during the heat-treatment of the multi-component hydrocarbon stream, the copolymers produced according to our invention have properties which are at least comparable wtih, and sometimes even superior to, copolymers obtained from pure tetrahydroindene compounds, e.g. 5-methyl and/or 6-methyl-4,7,8,9-tetrahydroindenes. Bearing in mind that it has long been established practice to require very pure monomers in ω-olefin polymerisations in order to yield useful high molecular weight materials, the production of useful products from our process was not predictable.

According to our invention, therefore, we provide as new compositions of matter amorphous vulcanisable high molecular weight copolymers obtained by the copolymerisation of at least one α-olefin with a fraction containing $C_{10}$ non-conjugated dienes having 4,7,8,9-tetrahydroindene structures, said fraction being derived from the product of heating a multi-component hydrocarbon stream containing cyclopentadiene and at least one other $C_5$ conjugated diene to cause a Diels-Alder reaction between the dienes.

The term "non-conjugated dienes having 4,7,8,9-tetrahydroindene structures" as it occurs in the specification and claims refers to those non-conjugated dienes having the structure I above.

We also provide a process for obtaining these copolymers which comprises contacting a mixture of at least one α-olefin and the above-mentioned fraction with an anionic co-ordination catalyst system known per se. Preferably, the said fraction is copolymerised with ethylene and at least one other α-olefin, especially propylene.

SOURCES OF THE MULTI-COMPONENT HYDROCARBON STREAM

Preferably the multi-component hydrocarbon stream is rich in cyclopentadiene and other $C_5$ conjugated dienes, i.e. piperylene and isoprene, but this is not essential for success. For example, although a particularly useful hydrocarbon stream of suitable composition is the overheads from a depentaniser of a distillation unit for cracked naphtha, the bottoms from a debutaniser in the same distillation train, although containing a considerable amount of higher molecular weight hydrocarbons, including aromatics, may also be used.

Fractionation of cracked naphtha is generally operated to separate a light fraction containing hydrogen and $C_1$ to $C_8$ hydrocarbons and a heavy fraction (fuel oil). The light fraction is generally subjected to further fractionation in a debutaniser to yield a light fraction containing up to $C_4$ hydrocarbons, including ethylene and propylene, and a liquid (the bottoms) containing mostly $C_5$–$C_8$ hydrocarbons. By the addition of a depentaniser to the distillation chain to which the bottoms from the debutaniser are fed, a further fraction boiling below about 50 C. at atmospheric pressure and consisting essentially of $C_5$ hydrocarbons may be isolated as the overheads. The exact constitution of this essentially $C_5$ fraction will depend upon the source of the crude oil from which the naphtha cut is taken, the conditions prevailing in the distillation of crude oil and the conditions operating in the naphtha cracker but it will consist essentially of pentanes, pentenes and $C_5$ dienes with small amounts of lighter and heavier hydrocarbons.

Cracked naphtha streams are particularly suitable sources of the multi-component streams used in our invention and these may be obtained, for example, by the steam cracking of naphtha or the coil cracking of naphtha. Other sources may also be used for our $C_5$ stream, however; e.g. by-products in the natural gas, gas, coal-tar and petroleum industries. Examples are hydrocarbon fractions produced in the manufacture of coal gas, coke oven gas, carburated water gas and oil gas, fractions from the destructive distillation of coal, and fractions from cracking natural gas.

CONSTITUTION AND TREATMENT OF THE MULTI-COMPONENT HYDROCARBON STREAM

To obtain the $C_{10}$ non-conjugated diene fraction used in the production of the copolymers of our invention, the multi-component hydrocarbon stream, which is preferably an essentially $C_5$ hydrocarbon stream as described above, is heated to cause Diels-Alder addition reactions to occur between the cyclopentadiene and the acyclic conjugated diene or dienes. The reaction is preferably effected under superatmospheric pressure in order to achieve liquid phase reaction and high yields of codimers. Temperatures of from 150° C. to 300° C. and pressures of from about 50 lbs./sq. in. to about 1000 lbs./sq. in., are generally used although the use of higher or lower temperatures and pressures are not excluded. However, operations at the higher temperatures may lead to the excessive by-production of resinous material and to reduced yields of Diels-Alder adducts due to unfavourable displacement of the equilibrium, and operations at lower temperatures may lead to much reduced yields. It is quite satisfactory to use autogenous pressures at these temperatures. Higher or lower persusres may be used if desired but little or no advantage is gained.

In order that the product contain a high proportion of our preferred codimers having a 4,7,8,9-tetrahydroindene structure, we have found it profitable to use temperatures of from 170° C. to 280° C., the higher temperatures generally giving higher yields of preferred codimers although the improvements obtained above 250° C. appear to be marginal since yields corresponding to 95% of theoretical have been obtained at this temperature within reasonable periods of time. Below 170° C., there is a tendency for homodimers and codimers having 4-alkenyl-[2.2.1]-bicycloheptene and alkyl 4-alkenylcyclohexane structures to predominate and above 280° C. little further advantage appears to be gained. We have also found that the best concentrations of preferred codimers in the products are generally obtained when using streams containing approximately equimolar (e.g. 1:2 to 2:1) quantities of cyclopentadiene and conjugated acyclic diene. The use of excess acyclic diene often leads to better utilisation of the cyclopentadiene but the side-production of codimers of the acyclic conjugated dienes and of homodimers is also encouraged and therefore the overall proportion of preferred codimers in the product may be reduced. It is also preferred where possible that a hydrocarbon stream is used wherein the ratio of isoprene/piperylene is high since isoprene tends to be more reactive than piperylene and the cyclopentadiene/isoprene adducts are preferred in the polymerisation because they carry a methyl group on a doubly bound carbon atom.

It is usual, but not essential, to operate in the absence, or substantial absence, of oxygen and moisture.

The time required for reaction will vary with the conditions employed but times of from 1 second to 6 hours are generally used. In general it is preferred to use as short a time as is possible at the chosen temperature, concomitant with good yields of dimer, because we have noted that the production of resinous by-products is encouraged by long reaction times. The optimum combination of time and temperature depends upon the composition of the $C_5$ fraction.

Catalysts may be added to the reaction mixture if desired but are not essential. Being exothermic in nature, the reaction may require the application of cooling, at least in the earlier stages, just after reaction commences.

The process may be operated batchwise or continuously. The continuous process may be carried out in a stirred-pot reactor or, preferably, in a tubular reactor. The temperature may be varied during the batchwise process or along the length of the tubular reactor. The desired dwell time for the reaction may be arrived at by suitably adjusting the effective length of the tubular reactor and the rate of passage of the hydrocarbon stream therethrough.

If desired, the multi-component hydrocarbon stream may be modified by the addition of further conjugated diene material, e.g. butadiene, isoprene, cyclopentadiene and/or piperylene. For example, as has been stated above, optimally the molar amount of cyclopentadiene present should be substantially equal to the total amount of acyclic conjugated dienes. If suitable hydrocarbon streams are not immediately available, situations approaching this may be obtained artificially by adding extra cyclopentadiene or acyclic conjugated diene to the hydrocarbon stream, as desired. Where the cyclopentadiene is predominant in the $C_5$ stream, and added diene is suitably butadiene for economic reasons although, for example, isoprene and/or piperylene may also be used.

The product obtained from the heat treatment contains a mixture of non-conjugated dienes having 4,7,8,9-tetrahydroindene structures together with other non-conjugated dienes of identical or closely similar molecular weight, pentanes, pentenes, unreacted $C_5$ conjugated dienes, and higher molecular weight materials, possibly including some resinous products. The exact constitution depends upon the exact constitution of the multi-component stream subjected to the heat-treatment and the exact conditions of the heat treatment.

This product may, if desired, be used as such in the copolymerisation without any further treatment, and vulcanisable copolymers may be obtained. However, if unreacted conjugated dienes are present, they may tend to promote some gel formation during the polymerisation reaction thus yielding products which may be difficult to mill. Therefore, it is preferable first to remove that fraction having an atmospheric boiling point below 50° C. and more preferably below 115 to 140° C. In general we have found that very little of the product boils between 50 and 140° C. By doing this, not only is the danger of gel formation reduced or avoided altogether but higher yields of polymer may be obtained and furthermore the low boiling fraction that has been removed may be recycled for further heat treatment or used as fuel, thereby further enhancing the economics of our process.

It is also preferable to remove that fraction boiling above 250° C. at atmospheric pressure so as to ensure that no resinous material is fed to the polymerization reactor. Most profitably, a fraction of the product of the heat treatment is used which distills in the range 140 to 190° C. at atmospheric pressure or within an equivalent temperature range at other pressures, e.g. at about 50 to 70° C. at an absolute pressure of about 10 to 15 mm. of Hg. This fraction will contain the desired 4,7,8,9-tetrahydroindene-structured $C_{10}$ non-conjugated dienes (which have boiling points in the range 175–185° C.) together with a very large number, possibly up to twenty, of other non-conjugated dienes which are homodimers and co-dimers of the $C_5$ conjugated dienes present in the original multi-component hydrocarbon stream. However, unexpectedly we have found it unnecessary to use any finer fractions, so long as our preferred heat treatment conditions are used, because in general the other non-conjugated dienes in the fraction are either in insufficient concentration to take any measurable part in the polymerisation process or else are insufficiently active to take part in the copolymerization to any significant extent. Furthermore, since very little material in the product appears to boil between about 50° C. and 125 to 140° C. on the one hand, and between 190° C. and 250° C. on the other, this fraction may be separated by the use of relatively simple and unsophisticated distillation apparatus.

THE COPOLYMERISATION

The copolymerisation according to our invention may be effected using the known methods of forming copolymers from α-olefins and non-conjugated dienes. Thus, it may be effected by contacting a mixture comprising (a) a fraction of the heat-treated material, said fraction containing $C_{10}$ dienes having a 4,7,8,9-tetrahydroindene structure, and (b) at least one α-olefin, with a suitable anionic co-ordination catalyst.

Preferably, the mixture comprises the said fraction, ethylene and at least one other α-olefin which is preferably propylene although other α-olefins, e.g. containing up to 8 carbon atoms, may be used. Examples are butene-1, pentene-1, 2-methyl pentene-1, 4-methyl pentene-1, hexene-1 and 3,5,5-trimethyl pentene-1. Propylene is particularly preferred because of its availability and for the properties of the products derived from it.

Preferably, the anionic co-ordination catalyst contains chlorine and comprises a compound of a metal of Group V$b$ of the Periodic Table of the Elements and a metal of Group I$a$, II or III$a$ of the Periodic Table of the Elements, or an alloy, hydride (including complex hydride) or organo-metallic derivative thereof; these two components being chosen such that at least one contains chlorine. The Periodic Table of the Elements referred to is that found inside the back cover the Handbook of Chemistry and Physics, published by the Chemical Rubber Co., 48th Edition.

The preferred Group V$b$ metal compounds are compounds of vanadium although niobium and tantalum compounds may also be used, e.g. $NbCl_4$ and $TaCl_4$.

Of the metals of Groups I$a$, II and III$a$, aluminum is much preferred, especially in the form of organo-aluminum compounds, although others that may be mentioned particularly are lithium and beryllium. For example, there may be used trialkyls, dialkyl monohalides, monoalkyl dihalides, alkenyls, alkllenes, cycloalkyls, mixed alkyl cycoakyls, alkoxdies, mixed alkyl alkoxides, aryls mixed alkyl aryls, and alkyl hydrides of aluminum alone or complexed with, for example, weak Lewis bases. Examples are: aluminum triethyl, aluminum triisobutyl, aluminum trihexyl, aluminum diethylmonochloride, aluminum diethylmonoiodide, aluminum diisobutylmonochloride, aluminum monoethyldichloride, aluminum butenyldiethyl, aluminum isohexenyldiethyl, 2 - methyl - 1,3 - di-(diisobutylaluminum)-butene, aluminum tri-(cyclopentylmethyl), aluminum tri-(dimethylcyclopentylmethyl), aluminum triphenyl, aluminum tritolyl, aluminum di-(cyclopentylmethyl) monochloride, aluminum diphenylmonochloride, aluminum diisobutylmonochloride complexed with anisole, aluminum monochloromonethyl monoethoxide, aluminum diethylpropoxide, aluminum monochloromonopropyl monoethoxide, aluminum diethylmonohydride, aluminum diisobutylmonohydride, aluminum monoethyl dihydride, lithium aluminum diisobutyl dihydrade, aluminum chlorohydride.

The vanadium compounds used are preferably soluble in the polymerisation medium and are generally halides or oxyhalides, e.g. vanadium tetrachloride, vanadium oxychloride and vanadium tetrabromide, or compounds wherein at least one of the vanadium valencies is satisfied by an oxygen or nitrogen atom linked to an organic group, e.g. the triacetylacetonate, tribenzoylacetonates, diacetylacetonate, haloacetylacetonates, trialcoholates, haloalcoholoates, etherates and aminates of vanadium halides and oxyhalides.

Preferably, the catalyst components are wholly dissolved, highly dispersed or amorphous colloidally dispersed in the polymerisation medium.

Particular examples of suitable catalyst systems are aluminum diethyl chloride with vanadium triacetylacetonate, vanadium tetrachloride or vanadium oxytrichloride ($VOCl_3$); aluminum tri(n-hexyl) with vanadium tetrachloride and aluminum triisobutyl with vanadium oxytrichloride.

The activity of the co-ordination catalyst systems varies according to the molar ratio of the compounds employed and the optimum ratio depends upon the choice of individual catalyst components. For example, as a general rule if aluminum trialkyls are used with vanadium halides or oxyhalides the preferred ratio will be in the range 1:1 to 20:1 and generally 2:1 to 4:1. The preferred ratios are different if aluminum diakyl halides are used in place of the trialkyls; for example, with vanadium triacetylacetonate the best results are usually obtained using a 4:1 to 10:1 molar ratio. The preferred molar ratio for aluminum diethyl chloride with vanadium tetrachloride is about 5:1 while that for aluminum triisobutyl with vanadium oxychloride is about 2:1.

The polymerisation may be carried out in the presence of a diluent which may be a hydrocarbon or a mixture of hydrocarbons, e.g. n-hexane, n-heptane, toluene, xylene and mixtures of these. However, the polymerisation may also be effected in the absence of such diluents by using the comonomers in liquid form. The temperature chosen for the polymerisation will depend upon the nature of the catalyst components and the choice of monomers but will generally be in the range −50° C. to +60° C. Where high molecular weight polymers are desired and a catalyst system comprising vanadium and aluminium compounds is used, it is preferred to effect the polymerisation, and preferably prepare the catalyst also, at a temperature below +10° C.

If desired, the polymerisation system may be pressurised, e.g. by ethylene or a mixture of the ethylene and α-olefin where the latter is also gaseous. Constant pressure conditions may be maintained by feeding ethylene, or the mixture of ethylene and gaseous α-olefin, into the system at the rate at which it is used up in the polymerisation.

A substantially oxygen-free atmosphere is desirable to avoid de-activation of the catalyst system and the polymerisation may be effected in an atmosphere composed of the gases of the monomers to be polymerised or in an atmosphere of an inert gas, e.g. nitrogen. It is also preferred that moisture is absent.

The following is a representative process for making those copolymers. A vessel having an inlet and outlet for gaseous materials, a stirrer, a thermometer and a serum cap is partially filled with an inert organic diluent, e.g. n-heptane. A mixture of ethylene and propylene gases is then passed through the vessel in a predetermined molar ratio so as to remove substantially all atmospheric oxygen and the vessel is adjusted to the temperature to be used for the polymerisation. When a steady flow has been obtained and substantially all the atmospheric oxygen has been removed, the desired amount of treated $C_5$ hydrocarbon stream is added to the vessel followed by the co-ordination catalyst, e.g. aluminium diethyl chloride and vanadium triacetylacetonate. If the components of the co-ordination catalyst are added separately, the transition metal compound is preferably added last. Alternatively, the two components of the catalyst system may be mixed together at the polymerisation temperature (or at room temperature if the polymerisation is to be effected above room temperature) and then added to the polymerisation system as a mixture. The catalyst components are generally added as solutions in the diluent used for the polymerisation.

When the catalyst components have been added, the polymerisation reaction commences. At the end of the reaction the polymerisation may be halted by the addition of a compound which would deactivate the catalyst system, for example an alcohol, e.g. methanol. The polymer is usually in the form of a solution in the diluent and the solution may then be treated with a material which will remove the catalyst residues, e.g. dilute hydrochloric acid. After this, the polymer may be recovered by pouring the solution into a non-solvent of the polymeric material, e.g. methanol. Alternatively the polymer solution, after treatment to deactivate that catalyst system and to remove the residues, may be injected into a stream of hot water or poured into excess methanol thereby precipitating out the polymer. The solid material may then be filtered, washed and dried.

In order to obtain good vulcanisation properties it is preferred to obtain the best random distribution of the residual unsaturation throughout the polymer chain. This may be achieved by the use of a continuous polymerisation process by continuously feeding, discharging and preferably also recycling a mixture of monomers of constant composition and by operating at high space velocities, e.g. as described more fully in Examples 16 to 24.

The polymeric products obtained by the process are amorphous rubbery high molecular weight copolymers containing residual unsaturation in the macromolecules and are readily vulcanisable to products having an attractive combination of physical properties. By amorphous, we mean that the polymers are soluble in cold hydrocarbon or chlorinated hydrocarbon solvents, e.g. n-heptane, benzene, toluene or chlorobenzene. By high molecular weight, we mean that they have an intrinsic viscosity of at least 0.5, and generally 1 or more. It is preferred that the polymers have intrinsic viscosities of from 1 to 5 although viscosities higher than 5 are possible. Intrinsic viscosities referred to here and elsewhere in the specification and claims are measured on solutions of the polymer in carbon tetrachloride at 30° C.

In general we prefer the copolymers to contain at least 10% by weight each of ethylene and propylene and at least 1% of diene. Materials having a very useful combination of physical properties for unvulcanised elastomers contain at least 30% by weight each of ethylene and propylene and from 2 to 10% by weight of diene, the higher unsaturations generally being reflected in higher tensile strengths and higher moduli in the vulcanisates.

Before vulcanisation they may be mixed with plasticisers, fillers and pigments and vulcanisation catalysts and other additives known in the art for such materials.

It will be appreciated that from many of the sources for our specified $C_5$ gas streams, hydrocarbon streams may be obtained which contain ethylene and propylene as well. Such streams may be treated to recover separately (a) these two alkenes and (b) a multi-component hydrocarbon stream containing cyclopentadiene and at least one other $C_5$ conjugated diene. Fraction (b) may then be subjected to the heat treatment described hereinbefore and then, purified if necessary, re-combined in suitable proportions with the ethylene and propylene, both suitably purified if necessary, under polymerisation conditions to yield a polymer containing residual unsaturation.

The invention is now illustrated but in no way limited by the following examples.

The multi-component hydrocarbon streams used in the examples were analysed by passing them through a Perkin-Elmer F.11 gas/liquid chromatograph comprising a column 12 ft. long by 3/16 inch internal diameter packed with 20% dimethyl succinate on Embacel at 25° C. using nitrogen at 10 lbs./sq. in. as the carrier gas. The peaks so obtained were identified by comparing them with the peaks obtained by individually passing through the column the alkanes, alkenes, and dienes which were the expected components of the streams. Where the results were unclear or ambiguous, further corroboration was obtained by using a Perkin-Elmer 452 gas/liquid chromatograph fitted with a katharometer detector, trapping a sample of the material corresponding to any particular peak in a capillary tube immersed in solid carbon dioxide and identifying it by mass spectrometery and/or nuclear magnetic resonance techniques. The concentrations of the components in the streams were estimated by the usual method of calculating the area under each peak and comparing it with the area under the corresponding peak obtained for the pure material.

The fractions of the products of the heat treatment of the multi-component hydrocarbon streams were analysed using a Perkin-Elmer 452 gas/liquid chromatograph fitted with a katharometer and having a column 25 ft. long by 3/16 inch internal diameter packed with 30% Carbowax on Embacel at 150–160° C. The carrier gas employed was helium at 20 lbs./sq. in. The peaks were identified by retention times where standard samples were available. All the 4,7,8,9 - tetrahydroindene - structured non-conjugated dienes, all the isoprene homodimers and some of the alkenyl-[2.2.1]-bicycloheptenes were identified in this manner. Also, as many as possible of the compounds corresponding to the peaks were trapped off and unequivocally identified using mass spectrometry and/or nuclear magnetic resonance techniques. This also applied to all the 4,7,8,9-tetrahydroindene-structured non-conjugated dienes, all the isoprene homodimers and some of the alkenyl-[2.2.1]-bicycloheptenes. The structures of those compounds not unequivocally identified, in general alkyl alkenylcyclohexenes, was inferred from their molecular weight, as measured by mass spectrometry. Thus, for example, any compound having a molecular weight of 134 and not having a 4,7,8,9-tetrahydroindene structure was inferred as having an alkenyl-[2.2.1]-bicycloheptene structure and any compound having a molecular weight of 136 was inferred as having an alkyl alkenylcyclohexene structure.

EXAMPLE 1

A series of experiments were conducted in order to ascertain the effect of the temperature of the heat-treatment of a multi-component hydrocarbon stream containing cyclopentadiene and $C_5$ acyclic dienes on the concentration of 4,7,8,9-tetrahydroindene structured dienes in the resultant hydrocarbon mixture.

In each experiment a pressure vessel was filled three-fifths full with a sample of the depentaniser overheads obtained from the distillation of a coil-cracked naphtha, purged of air, sealed and heated to the desired temperature as quickly as possible and maintained there for 2 hours under the autogenous pressures of the contents. In general in this and the experiments recorded hereinafter, the time taken to achieve the reaction temperature was about ½ hour. After cooling, the product was recovered and the concentrations of the various kinds of non-conjugated dienes so obtained were estimated by gas-liquid chromatographic techniques as described above.

The multi-component hydrocarbon stream used in the experiments was a cracked naphtha fraction. It was first analysed by gas-liquid chromatographic techniques as described above. The analysis was as follows:

| Component | Concentration, wt. percent | Component | Concentration, wt. percent |
|---|---|---|---|
| Cyclopentadiene | 9.1 | Isopentane | 14.8 |
| Piperylene (cis and trans) | 7.7 | Cyclopentane | 8.4 |
| Isoprene | 13.5 | n-Pentene | 8.3 |
| n-Pentane | 18.9 | Isopentene | 6.9 |

Unidentified pentanes, pentenes, and dienes (including some butadiene) completed the mixture.

The results of the experiments are tabulated below. The concentrations of the dienes are expressed as weight percent of the solution removed from the autoclave. The remainder of the solution is essentially pentanes, pentenes and unreacted dienes.

| | Reaction temp., °C. | Tetrahydroindene-structured [1] dienes, percent | Alkenylcyclohexene [2] structured dienes, percent |
|---|---|---|---|
| A | 160 | 6.1 | 1.2 |
| B | 190 | 9.2 | 1.1 |
| C | 210 | 16.1 | 2.0 |
| D | 250 | 19.4 | 1.7 |
| Theoretical maximum yield (based on 100% usage of cyclopentadiene) | | 20.3 | |

[1] The tetrahydroindene-structured dienes consisted essentially of 5 and/or 6-methyl 4,7,8,9-tetrahydroindenes (from cyclopentadiene and isoprene), 4- and/or 7-methyl 4,7,8,9-tetrahydroindenes (from cyclopentadiene and piperylene) and 4,7,8,9-tetrahydroindene (from cyclopentadiene and traces of butadiene in the starting mixture). The cyclopentadiene/isoprene adducts always formed about 60% of the mixture of tetrahydroindenes.
[2] The alkenylcyclohexene structured dienes consist of one or more of the following compounds: 1-methyl, 2-methyl, 3-methyl and 6-methyl-4-isopropenylcyclohexenes; 1,4-dimethyl, 1,5-dimethyl, 2,4-dimethyl, 2,5-dimethyl, 3,4-dimethyl, 3,5-dimethyl 4,7-dimethyl and 5,6-dimethyl 4-vinylcyclohexenes; and 1-methyl, 2-methyl, 3-methyl and 6-methyl 4-prop-2-enylcyclohexenes.

One or more of 4-isopropenyl, 4-methyl-4-vinyl, 4-prop-2-enyl and 4-vinyl-5-methyl bicyclo-[2.2.1]-heptene may also be present but only in very small concentrations.

EXAMPLE 2

A further series of experiments was carried out in order to ascertain the effect of the time of the heat-treatment of the multi-component hydrocarbon stream on the yield of tetrahydroindene-structured dienes and of resin. For these experiments a hydrocarbon stream was used containing cyclopentadiene, isoprene and piperylene in the molar ratios of 4.86:2.25:1.39. 76 mls. of hydrocarbon mixture were heated at 240° C. in a 250 ml. autoclave in the absence of air in each experiment. The results are tabulated below:

| Experiment | Time at temperature after the reaction temperature has been reached, min. | Yield of tetrahydroindene-structured dienes [1] | Yield of resinous material [1] |
|---|---|---|---|
| J | 30 | 29.6 | 21 |
| K | 60 | 32.4 | 39 |
| L | 180 | 33.0 | 48 |

[1] Expressed as weight percent of total dienes used.

It is readily seen that there is no advantage in using long reaction times. Similar results were obtained using the hydrocarbon stream of Example 1. For instance, the total yield of tetrahydroindene-structured dienes (recorded as weight percent of the solution removed from the autoclave) only increased from 14.5% after 1 hour to 16.7% after 3 hours, both times being at 210° C.

EXAMPLE 3

A further series of experiments were carried out so as to ascertain the effect of varying the ratio of cyclopentadiene to linear conjugated dienes in the multi-component hydrocarbon stream on the yield of tetrahydroindene structured dienes in the product of the heat-treatment. Each heat-treatment was effected in a 250 ml. sealed autoclave at 200° C. for 2 hours under autogeneous pressure of the contents and in the absence of air. The ratio of isoprene/piperylene was kept constant at 2:1 (molar) but the ratio of cyclopentadiene/(isoprene+piperylene) was varied. The results are tabulated below:

| Experiment | Molar ratio of cyclopentadiene (isoprene plus piperylene) | Amount of hydrocarbon mixture used, | Yield of tetrahydroindene-structured bicyclic diene [1] |
|---|---|---|---|
| M | 1:2 | 94.2 | 36.4 |
| N | 1:1 | 91.25 | 39.8 |
| O | 2:1 | 88.3 | 34.0 |

[1] Expressed as wt. percent of soln. removed from autoclave.

EXAMPLE 4

A series of experiments were carried out to determine the effect of varying the ratio of isoprene/piperylene in the multi-component hydrocarbon stream on the yield of tetrahydroindene-structured dienes in the product of the heat-treatment.

Each heat-treatment was effected in a 250 ml. sealed autoclave at 200° C. for 2 hours under the autogenous pressure of the contents and in the absence of air. The molar ratio of cyclopentadiene/(isoprene plus piperylene) was kept constant at 1:1 and the ratio of isoprene/piperylene was varied. The results are tabulated below.

| Experiment | Molar ratio isoprene/piperylene (cis plus trans) | Amount of hydrocarbon mixture used, ml. | Yield of tetrahydroindene-structured bicyclic dienes [1] |
|---|---|---|---|
| P | 3:1 | 91.25 | 51.33 |
| Q | 1:1 | 91.25 | 44.32 |
| R | 1:3 | 91.25 | 35.17 |

[1] Expressed as wt. percent of soln. recovered from autoclave.

EXAMPLE 5

364.3 g. of a multi-component hydrocarbon stream comprising 80.7 g. of pentanes and pentenes, 160 g. (2.42 moles) of cyclopentadiene, 76.5 g. (1.12 moles) of isoprene and 47.1 g. (0.7 mole) of piperylene were heated in a sealed one litre autoclave at 250° C. for 4 hours in the absence of air. The concentration of 4,7,8,9-tetrahydroindene-structured non-conjugated dienes in the product was found to be 23.2% by weight.

The experiment was then repeated with the addition of 33 g. (0.61 mole) of butadiene thus bringing the molar ratio of cyclopentadiene/acyclic conjugated diene to 1:1. The concentration of 4,7,8,9-tetrahydroindene structured non-conjugated dienes in the product was found to be 28.8% by weight.

EXAMPLES 6–13

A series of hydrocarbon mixtures were heated under pressure to cause Diels-Alder reactions between the diene components and the products were fractionally distilled. A fraction from each distillate was then used in a polymerisation process with ethylene and propylene. The fractions are identified as A, B and C.

Preparation of fraction A

A 334 g. sample of a liquid hydrocarbon mixture containing cyclopentadiene (56 mole percent), isoprene (27 mole percent) and piperylene (17 mole percent) was charged into a one litre pressure vessel which was purged of air, sealed and heated at 250° C. under autogenous pressure for 4 hours. After cooling, a slightly viscous liquid was recovered which was subjected to a crude atmospheric distillation in a vacuum-jacketed silvered column 18 inches long x ¾ inch diameter which had been packed with glass helices. Above the column was a condenser and between the column and the condenser two side arms were fitted, one carrying a thermometer pocket and the other opposite to it providing the off-take for the distillate fractions. From the distillation a first fraction was removed at a thermometer reading of 40° C. and below and then the recorded temperature rose rapidly to about 140° C. A fraction boiling over in the recorded range of 140° C. to 170° C. was then collected followed by a final fraction corresponding to recorded temperatures of from 170° C. to 240° C. The fractions comprised 1.5%, 78.5% and 20% by weight of the total yield of distillate. A small resinous residue was also obtained. The fraction recovered at thermometer readings in the range 140–170° C., which represented 52.6% by weight of the feedstock, was the fraction used in the polymerisation. On more accurate examination, it was found to have a boiling range of 140–190° C. at atmospheric pressure and on analysis was found to contain 75% by weight of a mixture of the methyl tetrahydroindenes obtained from isoprene and piperylene respectively with cyclopentadiene, 2.8% by weight of 4-alkenyl-[2.2.1.]-bicycloheptenes and 22.2% by weight of alkyl 4-alkenylcyclohexenes.

The heavier boiling fraction, on further examination was found to consist almost entirely of compounds boiling well above 190° C.

Preparation of fraction B

A liquid C₅ hydrocarbon stream boiling between about 28° C. and about 50° C. was analysed to contain the following (wt. percent): n-pentane, 4.2; n-pentene, 4.2; cyclopentadiene, 44; isopentane, 4.2; isopentene, 3.3; isoprene, 21; cyclopentane, 2.6; cyclopentene, 3.5; piperylene, 13.

363.3 g. of this stream were charged to a one litre pressure vessel which was purged of air, sealed and heated at 250° C. under autogenous pressure for 4 hours. On cooling, 344 parts of a viscous liquid were recovered and subjected to atmospheric distillation using the apparatus described above to yield three fractions:

| | Recorded thermometer reading, ° C. | Yield (by wt. of total), percent |
| --- | --- | --- |
| Fraction 1 | 30–50 | 16 |
| Fraction 2 | 150–170 | 35.5 |
| Residue (partly resinous) | | 38.5 |

Fraction 2 represents a yield of 45.7%, based on total diene content of the hydrocarbon stream. It was found to consist almost entirely of compounds boiling in the range 140–190° C. at atmospheric pressure and was used in the polymerisation.

Analysis of fraction 2 showed it to consist of 65.0% by weight of the methyl tetrahydroindenes obtained from isoprene and piperylene respectively with cyclopentadiene, 2.55% by weight of 4-alkenyl-[2.2.1]-bicycloheptenes and 32.25% by weight of alkyl 4-alkenylcyclohexenes.

Preparation of fraction C

The liquid hydrocarbon stream used in the preparation of Fraction B was modified by the addition of butadiene in an amount such that the total molar amount of butadiene, isoprene and piperylene was equal to the molar amount of cyclopentadiene in the mixture.

396.3 parts of this modified hydrocarbon stream were treated as described in the preparation of Franction B and 386.8 parts were recovered for atmospheric distillation using the apparatus described above from which three fractions were obtained:

| | Recorded thermometer reading, ° C. | Yield (by wt. of total), percent |
| --- | --- | --- |
| Fraction 1 | 36–48 | 16 |
| Fraction 2 | 140–175 | 46 |
| Fraction 3 | >175 | 13 |

There was also a residue consisting substantially of resin.

Fraction 2, which represents a yield of 57.3% based on the total diene content of the hydrocarbon stream, was used in the polymerisation. It was found to consist almost entirely of compounds boiling in the range 140–190° C. Fraction 3 was found to consist almost entirely of compounds boiling well above 190° C.

Analysis of Fraction 2 showed it to consist of 63.3% by weight of tetrahydroindene (from butadiene and cyclopentadiene) and methyl tetrahydroindenes obtained from isoprene and piperylene respectively with cyclopentadiene, 1.27% by weight of 4-alkenyl-[2.2.1]-bicycloheptenes and 34.2% by weight of alkyl 4-alkenylcyclohexenes and 4-vinylcyclohexene.

Polymerisations

The polymerisation apparatus consisted of a 1 litre flanged flask provided with tubes for feeding and discharging gases, a stirrer, a thermometer and a serum cap through which the diene and catalysts could be introduced. The tube for introducing the gases reached the bottom of the vessel and the apparatus was kept at a constant temperature of −20° C.

In each polymerisation, the vessel was charged with 500 ml. of anhydrous heptane which was then saturated at −20° C. by passing through it for 15 minutes a mixture of propylene and ethylene in a molar ratio of 4:1. The flow rate of the gas mixture was 8 litres/minute. A predetermined quantity of the chosen fraction as prepared above was then introduced into the apparatus followed by 0.6 g. of diethyl aluminium chloride as a solution in about 1 ml. of heptane and 0.193 g. of vanadium tetrachloride as a solution in about 2 mls. of heptane and polymerisation generally commenced immediately. After the desired polymerisation time a small amount of methanol was added to deactivate the catalyst and the polymer solution was recovered and washed with dilute hydrochloric acid. The solution was then poured into excess methanol, and the precipitated polymer was separated, spread out in a tray, and dried overnight in a vacuum oven.

100 parts by weight of each polymer were then mixed on a laboratory roll-mill with 1.5 parts of sulphur, 5 parts of zinc oxide, 1 part of stearic acid, 1.5 parts of tetramethyl thiuram monosulphide, 0.5 part of mercaptobenzothiazole and 50 parts of carbon black, and the product was vulcanised at 160° C. in a Wallace-Shawbury Curometer.

Standard dumbbell-shaped specimens having between the shoulders a neck 1 inch long and ⅙ inch wide were cut from each of the vulcanisates. The tensile strength at break and the modulus of each specimen were then tested on a Davenport Tensile Tester using a rate of elongation of 20±2 inches/minute at room temperature.

The polymerisation variables and the physical properties of the vulcanisates so produced are tabulated below. The vulcanisation time recorded in these examples was the time required to achieve 95% cure as measured in the Carometer.

hydrocarbons, some acromatic hydrocarbons including benzene, and dicyclopentadiene.

About 750 mls. of this mixture was heated at 250° C. for ½ hour in a 1 litre autoclave which had previously been purged of air. The autoclave was then opened and the product was distilled using a vertical silvered column 54 inches long by ¾ inch diameter which was packed with metal gauze coils. A water-cooled condenser was mounted at the top of the column and between the condenser and the column were fitted a thermometer pocket and a side arm for collecting the distillate. The distillation was effected at atmospheric pressure and the distillate boiling within the recorded temperature range of 28° C. to 110° C. was removed and discarded. The residue was then further distilled in a similar distillation unit but using a column 12 inches long by ⅝ inch diameter. This distillation was effected at an absoute pressure of 9 mm. of Hg and the fraction collected in the temperature range 53–60° C. was collected and retained. It was found to contain 72.5% of 4,7,8,9-tetrahydroindene structured non-conjugated dienes, 26.4% of alkyl 4-alkenylcyclohexenes and 1.0% of 4-alkenyl norbornadienes.

Using the polymerisation apparatus and process de-

| Example | Fraction and amount (g.) used in polymerisation | Polymerisation time (mins.) | Polymer Yield (grams) | Polymer Intrinsic viscosity | Polymer Unsaturation [1] | Vulcanisation time (mins.) | Elongation at break, percent | Modulus at 300% elongation (lbs./sq. in.) | Tensile strength (lbs./sq. in.) |
|---|---|---|---|---|---|---|---|---|---|
| 6 | A (1.8) | 5 | 14.6 | 1.99 | 1.95 | 62 | >600 | 1,215 | 3,590 |
| 7 | A (2.7) | 7 | 22.7 | 1.48 | 2.93 | 59 | >500 | 985 | 2,160 |
| 8 | A (6.3) | 7½ | 12.1 | 1.21 | 5.03 | 43 | >300 | 1,985 | 2,055 |
| 9 | B (4.5) | 5 | 10.1 | 1.65 | 6.4 | 24½ | >400 | 1,776 | 2,680 |
| 10 | B (6.3) | 7 | 18.7 | 1.40 | 7.5 | 31 | >500 | 1,000 | 2,710 |
| 11 | C (1.8) | 5 | 12.9 | 1.73 | 2.32 | 40 | >600 | 1,025 | 2,600 |
| 12 | C (5.4) | 7 | 17.0 | 1.59 | 3.64 | 24 | >500 | 1,275 | 2,820 |
| 13 | C (9.0) | 10 | 15.7 | 1.24 | 5.10 | 18½ | >300 | 3,180 | 3,520 |

[1] Recorded in these and the following examples as weight percent of non-conjugated diene residues in polymer and measured by the iodine monochloride method.

By way of comparison, polymerisations under identical conditions were effected wherein the fractions A, B and C above were replaced by the pure methyl tetrahydroindene adducts of isoprene and cyclopentadiene (comparative experiments U, V and W) or the pure methyl tetrahydroindene adducts of piperylene and cyclopentadiene (experiments X, Y and Z). The results are tabulated below.

scribed for Examples 6 to 13, a copolymerisation was effected using 10 mls. of this fraction. The other conditions were as follows. A 2 litre reaction vessel was used and 1 litre of 60–80° petroleum ether was used as solvent. The temperature of the polymerisation was −20° C. and the time was 6½ minutes. In all other respects, the details were as for Examples 6 to 13. 24.8 g. of copolymer were obtained having 3.2% unsaturation. After compounding

| Experiment | Amount of diene used, g. | Polymerisation time (mins.) | Polymer Yield, g. | Polymer Intrinsic viscosity | Polymer Unsaturation | Vulcanisation time (mins.) | Elongation at break, percent | Modulus at 300% elongation (lbs./sq. in.) | Tensile strength (lbs./sq. in.) |
|---|---|---|---|---|---|---|---|---|---|
| U | 4.5 | 9 | 29.2 | 1.03 | 3.65 | 54 | >600 | 835 | 1,970 |
| V | 6.3 | 8 | 28.7 | 1.28 | 3.98 | 39 | >500 | 1,315 | 2,305 |
| W | 9.0 | 7 | 21.9 | 0.92 | 4.70 | 37 | >400 | 1,605 | 2,225 |
| X | 1.8 | 11 | 17.3 | 1.90 | 1.84 | 37 | >700 | 585 | 2,105 |
| Y | 3.6 | 14 | 12.9 | (¹) | 4.20 | 21 | >600 | 870 | 2,675 |
| Z | 6.3 | 15 | 9.4 | 1.56 | 4.17 | 31 | >300 | 1,965 | 2,670 |

¹ Not measured.

The moduli of the vulcanisates of Examples 6 to 13 range from about 1000–3200 lbs./sq. in. compared with 600–2000 lbs./sq. in. for those of comparative experiments U–Z. The tensile strengths of the vulcanisates of Examples 6 to 13 range from about 2000 to 3600 lbs./sq. in. compared with 2000–2700 lbs./sq. in. for those of comparative experiments U to Z. In both series, the unsaturations are all in the range 2–5% with intrinsic viscosities ranging from 1 to 2.

EXAMPLE 14

A sample of the bottoms obtained from a debutaniser in the distillation of coil cracked naphtha was found to contain the following on analysis:

Percent by weight
Cyclopentadiene _____ 5.5
Isoprene _____ 15.6
Piperylene _____ 6.0

The remainder was pentanes, pentenes, higher aliphatic as described in Examples 6 to 13, a vulcanisable composition was obtained which was cured to 95% cure (as measured on a Shawbury-Wallace Curometer) in 30 minutes at 160° C.

The elongation at break, tensile strength at break and modulus at 300% elongation were 700%, 2580 lbs./sq. in. and 980 lbs./sq. in. respectively as measured on a Type E Tensometer at room temperature at 20 inches/minute using samples having the standard dumbbell shape and having dimensions of 1 inch between the shoulders, 0.2 inch wide and about 0.1 inch thick.

EXAMPLE 15

A 750 ml. sample of the bottoms obtained from a debutaniser in the distillation of coil-cracked naphtha and analysing as for the sample of Example 14 was heated at 250° C. for 30 minutes in a 1 litre autoclave which had previously been purged of air. After cooling the liquid part of the product was removed from the autoclave and analysed. It was found to contain 18.9% by weight of 4,7,8,9-tetrahydroindene structured non-conjugated dienes, the remainder being mostly pentanes, pentenes and unreacted dienes.

Without any further treatment, 30 mls. of this liquid product were used in a polymerisation with ethylene and propylene using the apparatus and process described in Example 14. The reaction temperature was −20° C. and the reaction time was 12 minutes, 13.2 g. of an unsaturated copolymer were obtained. After compounding as described for Examples 6 to 13, a vulcanisable composition was obtained which was cured to 95% cure (as measured on a Shawbury-Wallace Curometer) in 25 minutes at 160° C. Cured samples had the following physical properties (as measured on a Type "E" Tensometer using samples having the dimensions described in Examples 14).

Tensile strength at break: 1550 lbs./sq. in.
Elongation at break: 210%
Modulus at 100% elongation: 710 lbs./sq. in.

EXAMPLES 16–24

Each of the following examples demonstrates the application of a continuous polymerisation process to our invention.

Preparation and identification of diene fraction

In each example, the diene fraction used in the polymerisation was prepared as follows. About 750 ml. of a sample of depentaniser overheads from the distillation of a coil cracked naphtha and whose analysis is given below were charged to a one-litre autoclave which was then purged of air, sealed and subjected to a temperature of 250° C. for 30 minutes.

Analysis of multi-component hydrocarbon stream (the percentages given are by weight): butadiene, 3.1; n-pentane, 18.5; n-pentene 8.3; isoprene, 13.5; isopentane, 14.8; isopentene, 6.9; piperylene, 7.7; cyclopentane, 8.4; cyclopentadiene, 9.1.

The remainder consisted of unidentified pentanes, pentenes and dienes.

The cooled heat-treated product in each case was removed from the autoclave and fractionated to remove that fraction boiling in the range 28–110° C. at atmospheric pressure. A vertical silvered distillation column 54 inches long by ¾ inch diameter and packed with metal gauze coils was used for this distillation. It was connected at the top to a water-cooled condenser and between the condenser and the column were fitted a thermometer pocket and a side arm leading to a collecting vessel to collect the distillate. The temperatures referred to are those recorded on the thermometer.

The residue was then distilled at reduced pressure in a similar distillation unit but wherein the column was only 12 inches long by ⅝ inch diameter. It was also packed with metal gauze coils. The following fractions were collected and used in the polymerisation described below.

Fraction D collected at a recorded 60–120° C. on the thermometer at 13 mm. of Hg absolute.
Fraction E collected at a recorded 50–120° C. on the thermometer at 13 mm. of Hg absolute.
Fraction F collected at a recorded 50–120° C. on the thermometer at 13 mm. of Hg absolute.
Fraction G collected at a recorded 50–70° C. on the thermometer at 11–15 mm. of Hg absolute.
Fraction H collected at a recorded 50–70° C. on the thermometer at 11–15 mm. of Hg absolute.

Fractions D to H were analysed and their compositions were found to be as follows:

| Fraction | Percent by weight | | | | |
|---|---|---|---|---|---|
| | D | E | F | G | H |
| Methyl 4,7,8,9-tetrahydroindene(s) from isoprene and cyclopentadiene | 45.3 | 42.4 | 44.4 | 43.00 | 34.60 |
| Methyl 4,7,8,9-tetrahydroindene(s) from piperylene and cyclopentadiene | 14.5 | 13.6 | 13.7 | 12.45 | 8.97 |
| 4.7.8.9-tetrahydroindene (from butadiene and cyclopentadiene) | 11.8 | 14.0 | 13.9 | 8.50 | 17.20 |
| Total of tetrahydroindenes | 71.6 | 70.0 | 72.0 | 63.95 | 60.77 |
| 4-alkenyl-[2.2.1]-bicycloheptenes | 2.45 | 1.81 | 1.46 | 3.25 | 3.75 |
| Alkyl 4-alkenylcyclohexenes and 4-vinyl cyclohexene | 17.75 | 18.96 | 17.85 | 28.75 | 34.35 |
| Other dienes | 8.05 | 9.16 | 8.68 | 2.84 | 1.95 |

The polymerisations

The polymerisation apparatus consisted of three 50 litre glass storage vessels connected to a 5 litre stainless steel tapered polymerisation vessel provided with gas inlet and outlet, a stirrer, a thermometer, an overflow outlet and a cooling jacket. The storage vessels contained respectively solutions of diethyl aluminium chloride (0.754 g./litre), vanadium tetrachloride (0.578 g./litre) and fraction of heat-treated multi-component hydrocarbon stream (various concentrations, all in 60–80° C. petroleum ether. All three vessels were maintained under a blanket of nitrogen. The polymerisation vessel was purged with nitrogen and charged with a measured volume of the petroleum ether and then the contents of the storage vessels were supplied continuously to the stirred vessel by pump: the diethyl aluminium chloride solution was supplied at a rate of 4.8 litres/hour, the vanadium tetrachloride solution at 2.0 litres/hour and the solution containing the diene mixture at 5.2 litres/hour. The ratio of aluminium atoms to vanadium atoms in the polymerisation vessel was 5:1.

In each example, propylene and ethylene, separately metered, were passed into the polymerisation vessel below the level of the solvent by means of the gas inlet and the unused gases passed from the vessel through the gas outlet. The volume ratio of ethylene to propylene in the gas stream pumped into the vessel was kept constant at 1:4 and the mixture was pumped at a rate of 720 litres/hour.

The polymerisation vessel was cooled to the desired polymerisation temperature by circulating brine in the cooling jacket. The polymer solution obtained by the reaction passed out through the overflow and was mixed into hot water thereby causing the polymer to precipitate. The petroleum ether was flashed off and recovered for purification and re-use and the polymer was recovered in the form of crumbs which were converted to a crepe on a two roll mill having rolls 12 inches and 6 inches in diameter.

The conditions of the polymerisation and the yields and properties of the copolymers so produced are tabulated below.

| Example | Vol. of diluent in polymerisation vessel, litres | Diene fraction used | Concentration of diene fraction in diluent as pumped to reaction vessel. (expressed as gms./litre) | Polymerisation temperature,° C. | Yield of polymer (expressed as gms./litre of diluent) | Unsaturation, (percent) | Intrinsic viscosity |
|---|---|---|---|---|---|---|---|
| 16 | 4.2 | F | 2.3 | +1 | 29.7 | 1.22 | 2.32 |
| 17 | 2.85 | F | 4.59 | 0 | 22.5 | 2.08 | 2.40 |
| 18 | 3.7 | D | 6.9 | −6 | (¹) | 3.2 | 2.73 |
| 19 ² | 2.75 | F | 6.9 | +8 | 34.7 | 1.97 | 1.7 |
| 20 | 2.35 | E | 9.18 | +2 | 27.0 | 2.9 | 2.52 |
| 21 | 2.45 | F | 11.5 | +7 | 12.5 | 2.6 | 2.75 |
| 22 | 2.3 | H | 11.5 | 0 | (¹) | 2.84 | 3.40 |
| 23 | 2.1 | H | 16.1 | +4 | 13 | 4.05 | 2.60 |
| 24 | 1.8 | G | 23.0 | 0 | 12 | 3.90 | 1.97 |

¹ Not measured.
² Double the catalyst concentrations were used.

A vulcanisable composition was formed from each of the polymers of Examples 20–24 using the recipe and method described for Examples 6 to 13; and samples of the compositions were then vulcanised on a Shawbury-Wallace Curometer in order to establish the time to 95% cure and this time is recorded in the last column of the table below. 5 x 5 inch sheets of each composition, each about ⅛ inch thick, were then cured at the temperatures and for the times recorded in the table below and the variation of physical properties with time was studied. The properties were measured on dumbbell shaped samples having a neck between the shoulders 1 inch long by 0.2 inch wide by about 0.1 inch thick, using a Type E Tensometer at room temperature and an elongation rate of 20 inches/minute.

components of said stream to a temperature of from 150 to 300° C. at a pressure of from 50 to 1,000 lbs./sq. in., so as to cause a Diels-Alder reaction between the cyclopentadiene and acyclic $C_5$ conjugated diene in said stream, (iii) recovering from the heat-treatment of (ii) a hydrocarbon product containing 4,7,8,9-tetrahydroindene structures, together with other non-conjugated dienes, unreacted $C_5$ conjugated dienes and higher molecular weight material, (iv) combining at least the fraction of said hydrocarbon product boiling between 140° C. and 190° C. and containing 4,7,8,9-tetrahydroindene-structured non-conjugated dienes with ethylene and alpha olefin in the desired proportions, and submitting the mix-

| Example | Vulcanisation time and temperature | Properties of vulcanisate | | | Time to 95% of maximum modulus (as measured on the Curometer) |
|---|---|---|---|---|---|
| | | Elongation at break, percent | 300% modulus (lbs./sq. in.) | Tensile strength at break (lbs./sq. in.) | |
| 20 | 20 mins. at 160° C | ~1,200 | 467 | 2,536 | 48 minutes at 160° C. |
| | 30 mins. at 160° C | ~1,100 | 540 | 3,120 | |
| | 40 mins. at 160° C | ~1,000 | 561 | 2,961 | |
| | 50 mins. at 160° C | 980 | 632 | 3,088 | |
| 21 | 10 mins. at 160° C | ~800 | 450 | 2,400 | 19 minutes at 160° C. |
| | 15 mins. at 160° C | ~700 | 515 | 3,200 | |
| | 20 mins. at 160° C | ~650 | 735 | 3,500 | |
| | 25 mins. at 160° C | ~600 | 725 | 3,470 | |
| 22 | 10 mins. at 150° C | 860 | 600 | 2,012 | 39 minutes at 150° C. (This is equivalent to about 20 minutes at 160° C.) |
| | 20 mins. at 150° C | 730 | 955 | 2,860 | |
| | 30 mins. at 150° C | 675 | 1,052 | 2,910 | |
| | 40 mins. at 150° C | 629 | 1,083 | 2,892 | |
| | 50 mins. at 150° C | 575 | 1,296 | 2,954 | |
| 23 | 10 mins. at 150° C | 752 | 716 | 2,820 | 40 minutes at 150° C. (This is equivalent to about 20 minutes at 160° C.) |
| | 20 mins. at 150° C | 635 | 981 | 2,970 | |
| | 30 mins. at 150° C | 580 | 1,187 | 3,145 | |
| | 40 mins. at 150° C | 530 | 1,370 | 2,960 | |
| | 50 mins. at 150° C | 500 | 1,357 | 2,900 | |
| 24 | 15 mins. at 150° C | 500 | 1,490 | 2,725 | 30 minutes at 150° C. (This is equivalent to about 15 minutes at 160° C.) |
| | 25 mins. at 150° C | 462 | 1,735 | 2,755 | |
| | 60 mins. at 150° C | 500 | 1,800 | 3,150 | |

By way of comparison, the polymerisation process and apparatus described for Examples 16 to 24 were used but the diene fraction was replaced by 6.9 g./litre of pure methyl tetrahydroindene adducts obtained from isoprene and cyclopentadiene. The volume of diluent used in the reaction vessel was 1.8 liters and the polymerisation temperature was +8° C. The yield of polymer was 20.1 g./litre and the copolymer was found to have 3.65% unsaturation.

A vulcanisable composition was formed from it exactly as described above, the time to 95% cure of the composition and the varition of the physical properties of vulcanisates with time were measured as described above. The results were as follows.

| Vulcanisation time and temperature | Properties of vulcanisate | | | Time to 95% of maximum modulus (measured on Curometer) |
|---|---|---|---|---|
| | Elongation at break, percent | 300% modulus (lbs./sq. in.) | Tensile strength at break (lbs./sq. in.) | |
| 30 mins. at 160° C | 950 | 527 | 1,898 | 51 mins. at 160° C. |
| 40 mins. at 160° C | 810 | 662 | 2,085 | |
| 50 mins. at 160° C | 770 | 751 | 2,049 | |
| 60 mins. at 160° C | 840 | 686 | 2,178 | |

What we claim is:

1. A process for the production of an amorphous high molecular weight vulcanizable elastomer from a multi-component hydrocarbon stream derived from cracked naphtha, said stream containing ethylene, alpha olefin, cyclopentadiene and other $C_5$ dienes which process comprises the steps of
    (i) separating ethylene and alpha olefin from the stream,
    (ii) heating at least the portion of the stream containing cyclopentadiene and the other $C_5$ hydrocarbon ture to polymerization conditions known for the production of amorphous high molecular weight copolymers from alpha-olefins and non-conjugated dienes in the presence of an anionic coordination catalyst, and
    (v) recovering an amorphous high molecular weight vulcanizable copolymer.

2. A process according to claim 1 in which the portion of the hydrocarbon stream which is heated in Step (ii) consists essentially of $C_5$ hydrocarbons.

3. A process according to claim 1 in which the molar ratio of cyclopentadiene to total acyclic conjugated diene in the multi-component hydrocarbon stream is from 1:2 to 2:1.

4. A process according to claim 1 in which the multi-component hydrocarbon stream is modified by the addition thereto of more conjugated diene.

5. A process according to claim 1 in which the hydrocarbon product is derived by heating the multi-component hydrocarbon stream to a temperature of from 170 to 280° C.

6. A process according to claim 5 in which the hydrocarbon product is derived by heating the multi-component hydrocarbon stream to a temperature of from 200 to 250° C.

7. A process according to claim 1 in which there is used in Step (iv) a fraction of said hydrocarbon product, which fraction distills in the range 50 to 250° at 760 mm. of Hg.

8. A process according to claim 7 in which the fraction distills in the range 140 to 190° C. at 760 mm. of Hg.

9. A process according to claim 1 in which the hydrocarbon product is copolymerised with ethylene and at least one other α-olefin having from 3–8 carbon atoms.

10. A process according to claim 9 in which the α-olefin having from 3 to 8 carbon atoms is propylene.

11. An amorphous high molecular weight vulcanizable copolymer obtained by the process of claim 10.

12. A copolymer according to claim 11 comprising at least 30% by weight each of ethylene and propylene and from 1 to 10% by weight of non-conjugated diene.

13. A copolymer according to claim 11 having an intrinsic viscosity, measured on a solution of the copolymer in carbon tetrachloride at 30° C., of from 1 to 5.

14. A vulcanised elastomer obtained from a copolymer according to claim 11.

15. A shaped article formed from a vulcanized elastomer according to claim 12.

References Cited
UNITED STATES PATENTS
| | | | |
|---|---|---|---|
| 3,407,239 | 10/1968 | Cameli | 260—666 |
| 3,261,889 | 7/1966 | Vant Wout | 260—897 |

FOREIGN PATENTS
| | | | |
|---|---|---|---|
| 637,939 | 1/1964 | Belgium | C08—d |
| 1,053,578 | 1/1967 | Great Britain | C08—f15/40 |
| 6,511,889 | 3/1966 | Netherlands | C—07c |
| 975,724 | 8/1963 | Great Britain | C—08d, f |

OTHER REFERENCES
Chemical Abstracts, vol. 67, 44633w, Vulcanizable Olefin Polymer.

JOSEPH L. SCHOFER, Primary Examiner

R. S. BENJAMIN, Assistant Examiner

U.S. Cl. X.R.

260—82